United States Patent
Yamamoto et al.

(10) Patent No.: US 7,914,936 B2
(45) Date of Patent: Mar. 29, 2011

(54) FUEL CELL SYSTEM

(75) Inventors: Jun Yamamoto, Tokyo (JP); Shoji Ihara, Yokohama (JP); Toru Nakakubo, Kawasaki (JP); Satoshi Mogi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 12/041,942

(22) Filed: Mar. 4, 2008

(65) Prior Publication Data

US 2008/0220302 A1    Sep. 11, 2008

(30) Foreign Application Priority Data

Mar. 9, 2007    (JP) .................... 2007-060133

(51) Int. Cl.
*H01M 8/04* (2006.01)

(52) U.S. Cl. ........................ 429/442; 429/444

(58) Field of Classification Search .............. 429/442, 429/444, 443
See application file for complete search history.

(56) References Cited

U.S. PATENT DOCUMENTS

| 5,769,622 | A  | * | 6/1998 | Aoki et al. ............... 431/80 |
| 7,079,003 | B2 | * | 7/2006 | Furuta et al. ............ 337/184 |
| 2006/0141307 | A1 | * | 6/2006 | Ryoichi et al. ........... 429/24 |
| 2006/0199053 | A1 | * | 9/2006 | An et al. .................. 429/24 |
| 2008/0075990 | A1 | * | 3/2008 | Isozaki et al. ........... 429/20 |

FOREIGN PATENT DOCUMENTS

| JP | 9-147895 A | 6/1997 |
| JP | 2001-229942 A | 8/2001 |

* cited by examiner

*Primary Examiner* — Stephen J. Kalafut
(74) *Attorney, Agent, or Firm* — Fitzpatrick, Cella, Harper & Scinto

(57) ABSTRACT

A fuel cell system including a fuel supply control mechanism, which is disposed between the fuel tank and the fuel cell, capable of interrupting the supply of the fuel; and a temperature sensor provided to a circuit connecting the fuel supply control mechanism to the fuel cell for changing a resistance according to at least one of a temperature of the power generation of the fuel cell and a temperature of an electronic device supplied with electric power from the fuel cell. The fuel supply control mechanism is operated by a change in the resistance of the temperature sensor so that the supply of the fuel is interrupted. The system enables more reliably the interruption of a supply of fuel by a passive structure in a control when a temperature of a power generation portion of the fuel cell exceeds an allowable range.

3 Claims, 4 Drawing Sheets

FUEL CELL SYSTEM

BACKGROUND OF THE INVENTION

1. Field of the Invention

The present invention relates to a fuel cell system, and more particularly, to a fuel cell system having a structure capable of interrupting a supply of a fuel when a fuel cell or an electronic device connected thereto heats up to an abnormally high temperature.

2. Description of the Related Art

The fuel cell converts chemical energy obtained by chemically reacting a fuel, such as hydrogen, with oxygen directly into electric energy.

With this fuel cell, the energy capacity per volume/per weight can be dramatically increased compared to a related-art battery because the energy density of the fuel is high and there is no need for an active material on a cathode side due to oxygen being supplied by outside air.

Among various fuel cells, a polymer electrolyte fuel cell (PEFC) has a full solid structure using a flexible polymer film as an electrolyte. As such, the fuel cell is easy to handle. Also, this fuel cell has a simple structure, can be operated at low temperature, and can be activated an and deactivated in a short period of time.

Therefore, it can be said that the polymer electrolyte fuel cell is suitable for being mounted on mobile electronic devices.

The polymer electrolyte fuel cell basically includes a polymer electrolyte membrane having proton conductivity and a pair of electrodes provided at both surfaces of the polymer electrolyte membrane.

The electrodes each include a catalyst layer made of platinum or a platinum group metal catalyst and a gas diffusion electrode formed on the outside of the catalyst layer for supplying a gas and collecting current.

An assembly in which the electrodes and the polymer electrolyte membrane are integrated into one is referred to as a membrane electrode assembly (MEA) having such a structure that a fuel (hydrogen) is supplied to one of the electrodes and an oxidizer (oxygen) is supplied to another electrode to generate power.

A theoretical voltage of a fuel cell unit including a pair of membrane electrode assemblies is about 1.23 V. In a normal operational state, the fuel cell unit is driven by about 0.7 V in many cases.

Accordingly, in the case where a higher activation voltage is required, a plurality of fuel cell units are laminated and each fuel cell unit is arranged electrically in series to be used. This type of a laminate structure is called a fuel cell stack. In the stack, normally, an oxidizer flow path and a fuel flow path are isolated by a member called as a separator.

There are various kinds of methods of supplying fuel to the fuel cell. For example, the methods of supplying the fuel include: a method involving directly supplying a liquid fuel, such as methanol; a method involving supplying pure hydrogen; and a method involving modifying liquid fuel to generate hydrogen and supplying the hydrogen to a fuel electrode.

The hydrogen supply method can be used for mobile electronic devices because it leads to a high output and is advantageous with respect to downsizing.

In an operation of the fuel cell system, temperature control is important.

When a temperature of a power generation portion of the fuel cell exceeds an allowable range and becomes too high at a time of driving, the polymer electrolyte membrane is dried and proton conductivity decreases. Due to the occurrence of a so-called dryout, electric characteristics are reduced.

When a high load is applied in a dryout state, a power generation capacity of the fuel cell cannot keep up with this load, leading to a large polarity reversal and thereby seriously damaging the membrane electrode assembly (MEA) in some cases.

Further, when the fuel cell system is kept at a high temperature, a deterioration of components of the fuel cell may occur.

Further, other than in a normal operation, when the fuel cell is externally short-circuited, or when catalytic combustion is caused due to the damage of the membrane, the temperature of the power generation portion of the fuel cell exhibits a severe increase exceeding the allowable temperature range.

In this state, the part of the electronic device to which the fuel cell is mounted may be damaged.

Therefore, a measure for stopping the power generation is necessary when an abnormally high temperature exceeding the allowable range (hereinafter, merely referred to as "abnormally high temperature") is reached.

A method of interrupting the supply of the fuel is a reliable way of stopping the power generation when the fuel cell is at an abnormally high temperature. Conventionally, a method of this type is suggested.

For example, Japanese Patent Application Laid-Open No. H09-147895 discloses a method in which a temperature sensor and a control device are mounted, and when the abnormally high temperature is reached, a fuel supply valve is closed by the control device.

Further, Japanese Patent Application Laid-Open. No. 2001-229942 discloses a method in which a material that deforms at a high temperature is disposed in the fuel flow path. When the abnormally high temperature is reached, the fuel flow path is interrupted by the deformation of that material.

However, in Japanese Patent Application Laid-Open No. H09-147895, there is a problem in that an external power source is required in order to detect the temperature using a sensor and to operate the control device. Also, active control using the control device is required. This results in an increase in the size of the system.

Further, Japanese Patent Application Laid-Open No. 2001-229942 has a problem in that the interruption of the supply of highly dispersible hydrogen in the fuel flow path is unreliable. Also, the ability of the deformed material to return to its previous shape is doubtful.

SUMMARY OF THE INVENTION

In view of the above-mentioned problems, the present invention is directed to a fuel cell system in which, in a control, when a temperature of a power generation portion of a fuel cell exceeds an allowable range, a supply of a fuel can be more reliably interrupted by a passive structure, thereby enabling the downsizing of the fuel cell system.

The present invention provides a fuel cell system structured as described below.

According to the present invention, there is provided a fuel cell system including a fuel cell including a power generation portion provided with a fuel electrode and an oxidizer electrode for performing power generation using a fuel supplied from a fuel tank; a fuel supply control mechanism, which is disposed between the fuel tank and the fuel cell and is capable of interrupting a supply of the fuel; and a temperature sensor provided to a circuit connecting the fuel supply control mechanism to the fuel cell for changing the resistance according to at least one of a temperature of the power generation of the fuel cell and a temperature of an electronic device connected to the fuel cell to be supplied with electric power The fuel supply control mechanism is operated by a change in the resistance of the temperature sensor, so that the supply of the fuel is interrupted.

According to the fuel cell system of the present invention, when the temperature of the power generation portion of the fuel cell exceeds the allowable range and reaches a high temperature, the supply of the fuel can be more reliably interrupted by a simple structure, thereby enabling the downsizing of the fuel cell system.

Further, there is no need for an external power source, and wasteful output consumption can be avoided.

"Fuel cell" in the present invention conceptually includes a fuel cell unit and a fuel cell stack.

Other features of the present invention will become apparent from the following description of exemplary embodiments with reference to the attached drawings.

DESCRIPTION OF THE EMBODIMENTS

Next, an embodiment of the present invention will be described.

As a temperature sensor used in the present invention, a thermistor may preferably be used. A switch using a bimetal or a shape memory alloy may also be used. Further, opening/closing that accompanies a temperature change may be used as a change of the resistance of a temperature sensor.

In the case where a switch is used as a temperature sensor, since a range of the change in resistivity is wide and the change is abrupt, a high control reliability is advantageously obtained. A thermistor may be suitably used as a temperature sensor in a portable fuel cell system since it has a small number of parts and there is no movable portion.

Figure 1:
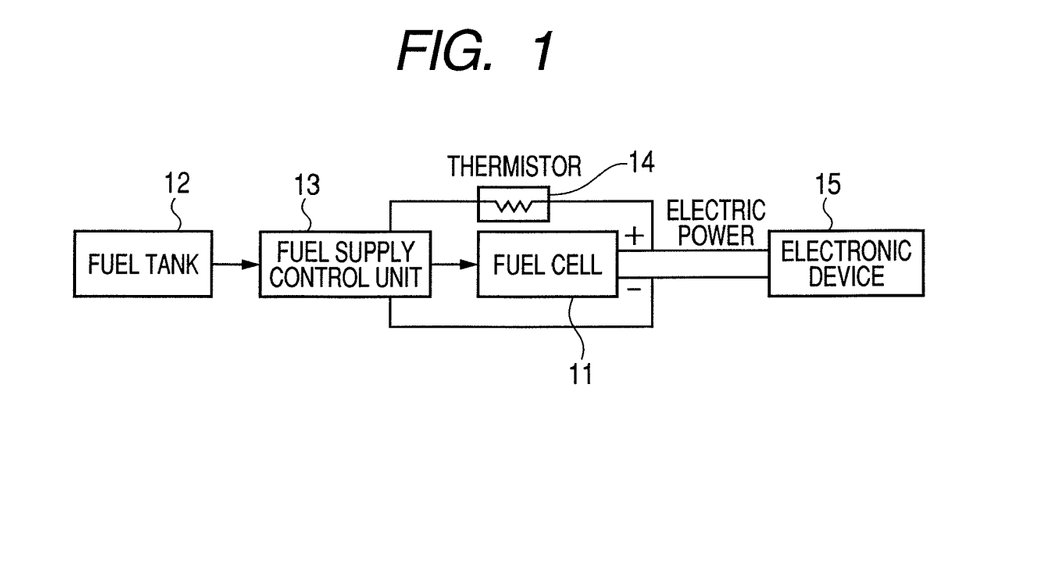
FIG. 1 is a schematic diagram illustrating a structure of a fuel cell system according to an embodiment of the present invention.

FIG. 1 is a schematic diagram illustrating a fuel cell system according to this embodiment.

In FIG. 1, there are illustrated a fuel cell 11, a fuel tank 12, a fuel supply control mechanism 13, a thermistor 14 as a temperature sensor, and an electronic device 15.

The fuel cell system according to this embodiment has the fuel cell 11 including a power generation portion having a fuel electrode and an oxidizer electrode and the electronic device, which uses electric power generated by the fuel cell as a power source.

A characteristic structure thereof is a structure including the fuel supply control mechanism 13 and the thermistor 14.

The fuel supply control mechanism 13 interrupts fuel supply between the fuel tank 12 and the fuel cell 11 by a change in the resistance of the thermistor 14 according to a temperature of the power generation portion of the fuel cell 11 or the electronic device 15 provided with the fuel cell 11.

The thermistor 14 is provided in a circuit connecting the fuel cell 11 to the fuel supply control mechanism 13.

The fuel supply is interrupted in the following manner. The resistance of the thermistor 14 changes according to a temperature of the fuel cell 11 or the electronic device 15 provided with the fuel cell 11, thereby changing the current flowing through the circuit. In response to the change in the current, the fuel supply control mechanism 13 is operated.

The fuel cell 11 of this embodiment may use any type of fuel, such as pure hydrogen and methanol, and may use any system for supplying the fuel. The fuel cell 11 includes a polymer electrolyte membrane having proton conductivity and two electrodes including a fuel electrode and an oxidizer electrode, which are provided at both sides of the polymer electrolyte membrane and each of which is formed of a catalyst layer and a gas diffusion layer.

A fuel is supplied to the fuel electrode from the fuel tank 12. There can be employed a structure in which oxygen is supplied to the oxidizer electrode through natural diffusion of air. This structure is suitable for downsizing the fuel cell system, which is desirable. Further, there can also be employed a structure in which oxygen gas is supplied to the oxidizer electrode by separately providing an oxygen tank, or a structure in which air is sent to the oxidizer electrode by using a fan.

As a material of the polymer electrolyte membrane, any type of material may be used. For example, a perfluorosulfonic acid-based proton-exchange resin membrane can be used.

The polymer electrolyte membrane needs to be quickly humidified by water produced by a power generation reaction of the fuel cell, so the polymer electrolyte membrane can be as thin as possible. From the viewpoints of mechanical strength, gas barrier properties, etc., the thickness of the membrane can be about 50 μm.

An electrode is fabricated, for example, as follows.

First, platinum black, catalyst-carrying particles such as platinum-carrying carbon, a polymer electrolyte solution, and an organic solvent, such as isopropyl alcohol, are mixed together to produce a catalyst ink.

The catalyst ink is applied to and form a film on, for example, a polymer film, such as polytetrafluoroethylene (PTFE) or a carbon electrode substrate of a conductive porous body, by a spray coating method, a screen printing method, a doctor blade method, or the like to thereby form a catalyst layer.

The catalyst layer thus obtained is contact-bonded by a thermal transfer, etc., on both sides of the polymer electrolyte membrane with the catalyst carrying side being inside, thereby providing a membrane electrode assembly for the polymer electrolyte fuel cell.

The fuel tank 12 may be of any type as long as it is capable of supplying the fuel to the fuel cell 11. The fuel may be pure hydrogen, hydrogen stored in a hydrogen storage material, a liquid fuel, such as methanol and ethanol.

Further, there may be employed a type of fuel tank that includes liquid fuel and a reformer of the fuel to supply reformed hydrogen to the fuel cell.

In this embodiment, in order to obtain high output density, there can be employed a structure in which pure hydrogen is supplied.

In addition, if the hydrogen storage alloy is used, the hydrogen may be stored at a lower pressure and efficiently, which is more desirable.

In this embodiment, in order to prevent the fuel supplied from the fuel tank 12 from leaking to the outside of the fuel cell system, a fuel flow path and a fuel electrode chamber are subjected to a sealing treatment at the connecting portions between respective components to maintain them in a hermetically-sealed state.

The fuel supply control mechanism 13 performs the control function so that, at a time of operation of the fuel cell system, the supply of the fuel from the fuel tank 12 to the fuel cell 11 is enabled, whereas, at a time of suspension, the supply of the fuel is interrupted by receiving a stop signal, etc., sent from the electronic device 15. There is provided an electromagnetic valve as a mechanism for controlling the supply of fuel by receiving such an electrical signal. Further, there may be employed a structure in which the fuel tank 12 is connected to the fuel cell 11 through a connector. A coupling of a connection port is opened when the connector is connected, and the coupling is closed when the connector is detached. There may also be employed a mechanism for interrupting the supply of the fuel by detaching the fuel tank 12 at the time of suspension.

Further, the fuel supply control mechanism 13 is connected via a circuit to the fuel cell 11 through the thermistor 14.

In this embodiment, in the case where the temperature of the power generation portion of the fuel cell is in the allowable range, the fuel can be supplied from the fuel tank 12 to the fuel cell 11. In the case where the temperature of the power generation portion of the fuel cell exceeds the allowable range, the supply of the fuel is interrupted.

For example, aside from the signal for supplying or interrupting the supply of the fuel to the fuel cell, the fuel supply control mechanism 13 is capable of interrupting the fuel supply according to a change in the current caused by the thermistor 14 when the temperature of the fuel cell 11 exceeds the allowable range. For example, the operation is performed such that the electromagnetic valve is closed or the connector is detached. Alternatively, there may be provided a fail-safe structure including another fuel control mechanism for performing an operation by a stop signal, and the fuel supply control mechanism 13 does not perform the operation by the stop signal from the electronic device 15 side and operates only when the temperature of the fuel cell 11 exceeds the allowable range.

The thermistor 14 can adjust the flowing current by changing its own resistance according to the temperature of the fuel cell 11.

Examples of a thermistor member include one having a negative temperature coefficient (NTC thermistor) and one having a positive temperature coefficient (PTC thermistor). The thermistor member is used in combination with a choice between an increase and a decrease in output in response to which the fuel supply control mechanism 13 operates to interrupt the fuel.

In this embodiment, either the NTC thermistor or the PTC thermistor can be used. However, the thermistor member having the negative temperature coefficient can be used so that the fuel supply control mechanism operates, in response to the increase in the output, to perform the interruption.

That is, by using the thermistor member having the negative temperature coefficient, the resistance can be reduced when the temperature of the fuel cell 11 increases. Further the interrupting operation of the fuel supply control mechanism 13 can be performed in response to the increase in the flowing current. In this case, the fuel supply control mechanism can be operated by a larger current, which is desirable.

Further, the thermistor member having the positive temperature coefficient and the fuel supply control mechanism operating in response to reduction in the output can be used in combination with each other. For example, when a normally closed valve and the PTC thermistor are used in combination with each other, the system with an enhanced fail-safe function can be realized, which is desirable.

Figure 2:
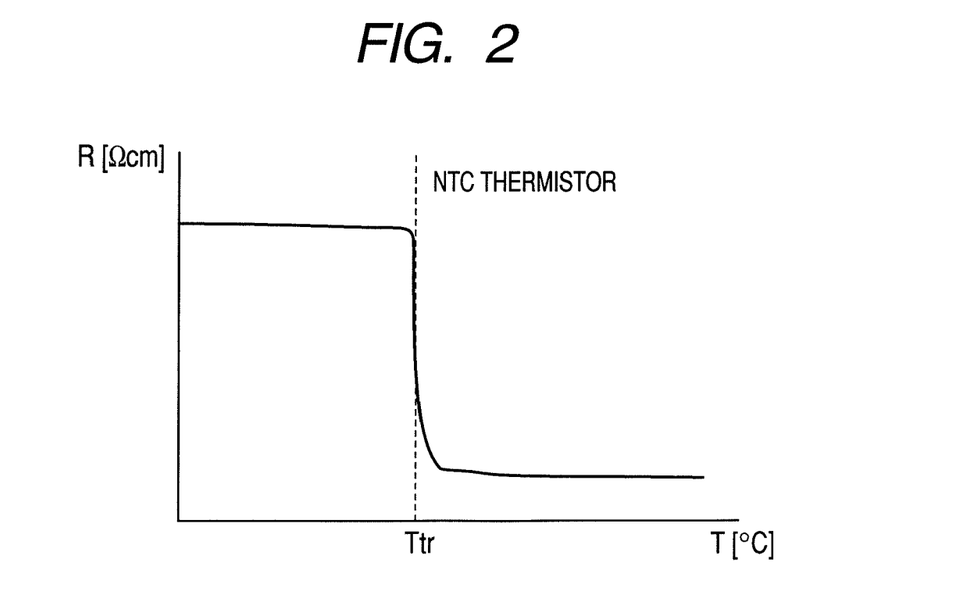
FIG. 2 is a graph illustrating temperature-resistance characteristics of a thermistor having a negative temperature coefficient, which is used in the embodiment and examples of the present invention.

Each of the thermistor members can be a thermistor having switching characteristics that allow the resistance to suddenly change when the temperature exceeds a certain threshold value as illustrated, for example, in FIG. 2.

For example, in the case where the thermistor has the negative temperature coefficient, there can be used a thermistor serving as a high resistance body when the temperature is lower than the threshold value, thereby allowing little current to pass, and serving as a low resistance body when the temperature is equal to or higher than the threshold value, thereby allowing current to pass in an amount sufficient for operating the fuel supply control mechanism.

As a result, a small current flowing from the fuel cell 11 to the fuel supply control mechanism 13 in the normal power generation is sufficient. Accordingly, wasteful fuel consumption can be suppressed.

Further, the thermistor 14 may not only be installed so as to change the resistance value according to the temperature of the fuel cell 11, but also to change the resistance according to the temperature of the electronic device 15.

With this structure, in the case where the temperature of the electronic device 15 exceeds the allowable range, the power generation of the fuel cell is stopped by interrupting the fuel supply. Thus, a further temperature increase of the electronic device 15 can be prevented.

Further, the fuel cell 11 can be prevented from being damaged due to an increase in of the electronic device 15.

In the case where the fuel cell 11 is a fuel cell stack, the fuel cell unit for supplying an output to the fuel supply control mechanism 13 can include some or all of the fuel cell units in the fuel cell stack.

That is, the output of the entire fuel cell stack may be supplied to the fuel supply control mechanism 13 in parallel to the electronic device 15. Alternatively, the output may be supplied to the fuel supply control mechanism 13 from some of the fuel cell units in the fuel cell stack. Depending on the output required for interrupting the operation of the fuel supply control mechanism 13, a design may be determined as desired.

Further, some of the fuel cell units in the fuel cell stack for supplying the output to the fuel supply control mechanism 13 have to supply the output to the fuel supply control mechanism 13 even when the temperature of the power generation portion of the fuel cell exceeds the allowable range.

Accordingly, some the fuel cell units in the fuel cell stack for supplying the output to the fuel supply control mechanism 13 can have higher heat and mechanical resistances than those of the other fuel cell units. For example, by increasing the thickness of the electrolyte membrane in some fuel cell units compared to that in the other fuel cell units, the resistance can be increased. Further, a fuel cell unit may be selected, which has a high discharge characteristic and a relatively small temperature increase, as a fuel cell unit disposed at an end portion of the fuel cell stack.

Further, the fuel cell unit for supplying the output to the fuel supply control mechanism 13 may have a structure performing both the output supply to the electronic device 15 side and the output supply to the fuel supply control mechanism 13.

Further, there may be employed a structure that does not output to the electronic device 15 side, but is specialized to supply its output only to the fuel supply control mechanism 13.

Using the above-mentioned structure, when the temperature of the power generation portion of the fuel cell exceeds the allowable range, the thermistor member can serve as both as the sensor and the output control. As a result, a simple structure can be achieved without the need for a separate control device.

Further, the thermistor member changes its resistance according to the temperature of the fuel cell, and the fuel supply control mechanism 13 operates by the output of the fuel cell. Accordingly, a system without an external power source can be provided.

Further, the output required for the operation is provided by the power generation by using the fuel supplied to the fuel cell. Accordingly, wasteful power consumption can be avoided.

Hereinafter, examples of the present invention are described.

Example 1

Figure 3:
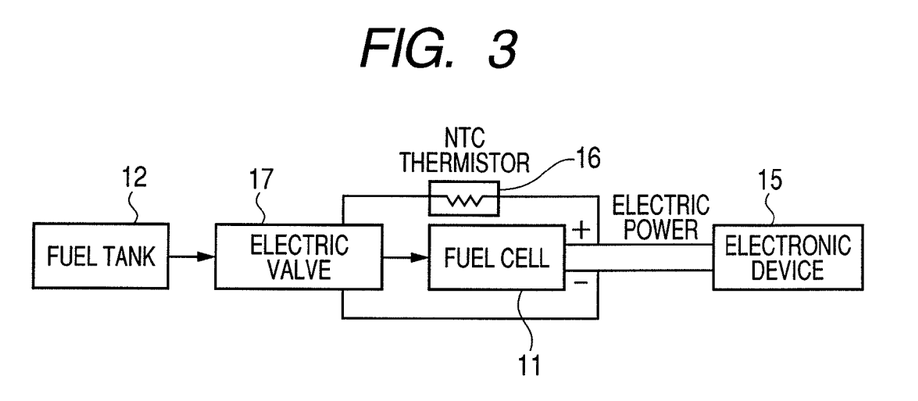
FIG. 3 is a schematic diagram illustrating a structure of a fuel cell system according to Example 1 of the present invention.

In Example 1, a fuel cell system in accordance with the present invention is described. FIG. 3 is a schematic diagram illustrating a structure of the fuel cell system according to this example.

In FIG. 3, the same portions as those of the fuel cell system according to the embodiment of the present invention illustrated in FIG. 1 are denoted by the same reference numerals, so that the common portions are not described.

In FIG. 3, there are illustrated an NTC thermistor 16 having a negative temperature coefficient and an electric valve 17 (electromagnetic valve).

In this example, the fuel supply control mechanism includes the electric valve 17. The electric valve 17 is installed between the fuel flow path connecting the fuel cell 11 and the fuel tank 12.

The electric valve 17 is controlled to be brought into an open state in response to a start-up signal from the electronic device 15, and is controlled to be brought into a closed state in response to a stop signal therefrom.

The electric valve 17 is connected via a circuit to the fuel cell 11 through the NTC thermistor 16 having the negative temperature coefficient separately from a circuit receiving the start-up/stop signal.

Further, there is employed a structure in which current flows in the circuit in such a direction that the electric valve 17 can be closed.

In the case where the temperature of the fuel cell 11 is in the allowable range, the NTC thermistor 16 is a high resistance body and current flowing through the circuit is small, so the electric valve 17 does not operate.

On the other hand, in the case where the temperature of the fuel cell 11 exceeds the allowable range and is equal to or is higher than a certain threshold value, the NTC thermistor 16 suddenly reduces its own resistance by the switching characteristics illustrated in FIG. 2.

As a result, current output from the fuel cell 11 flows through the circuit. In response to an increase in current, the electric valve 17 is closed.

Accordingly, in the case where temperature of the fuel cell 11 exceeds the allowable range, the fuel supply is quickly interrupted and the power generation can be stopped.

Thus, the increase in the temperature of the fuel cell 11 can be prevented, so that both the fuel cell 11 and the electronic device 15 can be protected.

Example 2

In Example 2, a fuel cell system according to a mode different from Example 1 is described.

Figure 4:
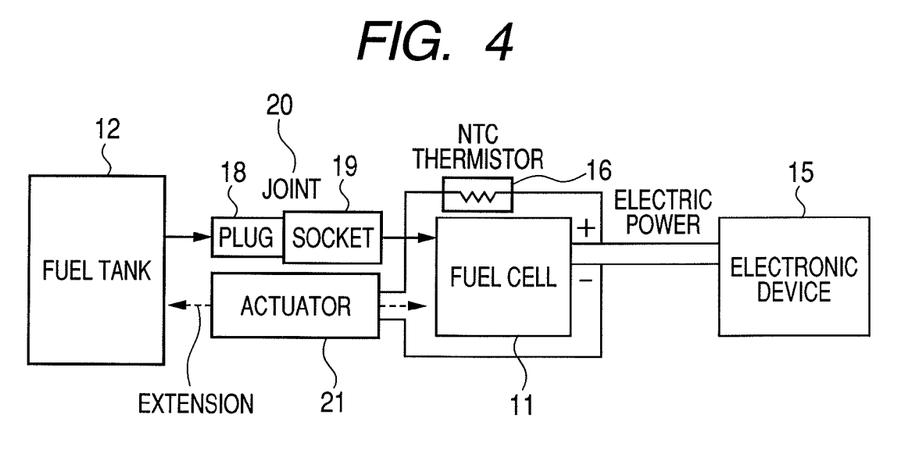
FIG. 4 is a schematic diagram illustrating a structure of a fuel cell system according to Example 2 of the present invention.

FIG. 4 illustrates a schematic diagram of a structure of the fuel cell system according to this example.

In FIG. 4, the same portions as those of the fuel cell system according to the embodiment of the present invention illustrated in FIG. 1 are denoted by the same reference numerals, so that the common portions are not described.

In FIG. 4, there are illustrated the NTC thermistor 16 having the negative temperature coefficient, a plug 18, a socket 19, a joint 20, and an actuator 21.

In this example, the fuel supply control mechanism includes the plug 18, the socket 19, and the actuator 21.

The fuel cell 11 and the fuel tank 12 are detachably connected to the joint (connector) 20 including the plug 18 and the socket 19.

Further, the plug 18, or both the plug 18 and the socket 19, is/are provided with a stop valve. The fuel flow path is brought in a communication state only when attached. In the detached state, the fuel flow path is closed.

The actuator 21 is connected to the fuel cell 11 via a circuit through the NTC thermistor 16 having the negative temperature coefficient.

Further, there is employed a structure in which current flows through the circuit in such a direction that the actuator 21 is operated in an extending direction.

Further, as a result of the extension, the actuator 21 applies a load between the fuel cell 11 and the fuel tank 12.

As a result, the joint 20 including the plug 18 and the socket 19 are detached by the load applied when the actuator 21 extends.

In the case where the temperature of the fuel cell 11 is in the allowable range, the NTC thermistor 16 is a high resistance body and the current flowing through the circuit is small, so the actuator 21 does not operate.

On the other hand, in the case where the temperature of the fuel cell 11 exceeds the allowable range and is equal to or is higher than a certain threshold value, the NTC thermistor 16 suddenly reduces its own resistance by the switching characteristics illustrated in FIG. 2.

As a result, current output from the fuel cell 11 flows through the circuit. In response to an increase in the current, the actuator 21 is extended.

While the actuator 21 extends, the joint 20 including the plug 18 and the socket 19 are detached, thereby interrupting the fuel supply.

Accordingly, in the case where the temperature of the fuel cell 11 exceeds the allowable range, the fuel supply is quickly interrupted and the power generation can be stopped.

Thus, the increase in the temperature of the fuel cell 11 can be prevented, so that both the fuel cell 11 and the electronic device 15 can be protected.

Example 3

In Example 3, a fuel cell system according to a mode different from Examples 1 and 2 is described.

Figure 5:
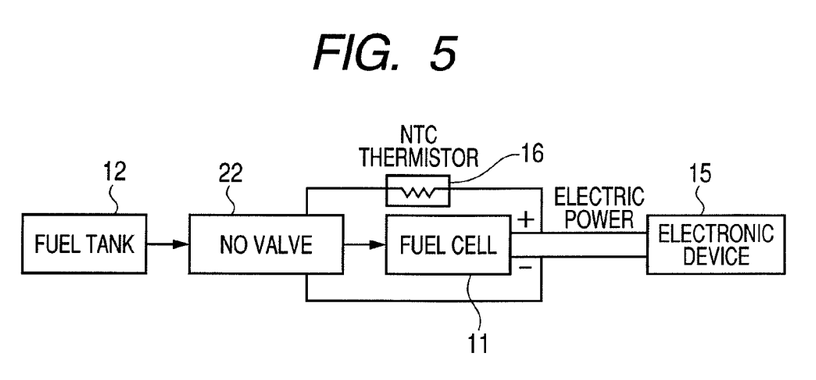
FIG. 5 is a schematic diagram illustrating a structure of a fuel cell system according to Example 3 of the present invention.

FIG. 5 illustrates a schematic diagram of a structure of the fuel cell system according to this example.

In FIG. 5, the same portions as those of the fuel cell system according to the embodiment of the present invention illustrated in FIG. 1 are denoted by the same reference numerals, and the common portions are not described.

In FIG. 5, there is illustrated a normally open valve (NO valve) 22.

In this example, the fuel supply control mechanism includes a normally open valve (NO valve) 22.

The NO valve 22 is installed in the fuel flow path connecting the fuel cell 11 to the fuel tank 12. The NO valve 22 is continuously in an open state when electric power is not supplied and the fuel is supplied. On the other hand, the NO valve 22 is in a closed state when at least threshold electric power is supplied, interrupting the fuel supply. As the valve of this type, a solenoid valve, a bimorph piezoelectric element valve, or the like is used.

The NO valve 22 is connected via a circuit to the fuel cell 11 through the NTC thermistor 16 having the negative temperature coefficient separately from the circuit that receives signals and interrupts the supply of the fuel to the fuel cell. In the case where the temperature of the fuel cell 11 is in the allowable range, the NTC thermistor 16 is a high resistance body and current flowing through the circuit is small, so the NO valve 22 does not operate.

On the other hand, in the case where the temperature of the fuel cell 11 exceeds the allowable range and is equal to or is higher than a certain threshold value, the NTC thermistor 16 suddenly reduces its own resistance by the switching characteristics illustrated in FIG. 2.

As a result, current output from the fuel cell 11 flows through the circuit. In response to an increase in current, the NO valve 22 is closed.

In this case, when the temperature of the fuel cell 11 is reduced such that it is equal to or lower than the threshold value, or when the fuel remaining in the fuel cell 11 is consumed, the output supply to the NO valve 22 ends, the NO valve 22 again opens and the fuel (if available) is supplied.

If the cause of the abnormally high temperature is not resolved, the fuel cell 11 can again reach the abnormally high temperature. Accordingly, a supply and stoppage of the fuel may be repeatedly performed.

Even in this case, the power generation of the fuel cell can be periodically suppressed. Accordingly, the temperature increase can be prevented, or the temperature can be maintained in the allowable range.

In this state, the electronic device 15 can provide an abnormality warning to the user's attention.

Example 4

In Example 4, a fuel cell system according to a mode different from the above examples is described.

Figure 6:
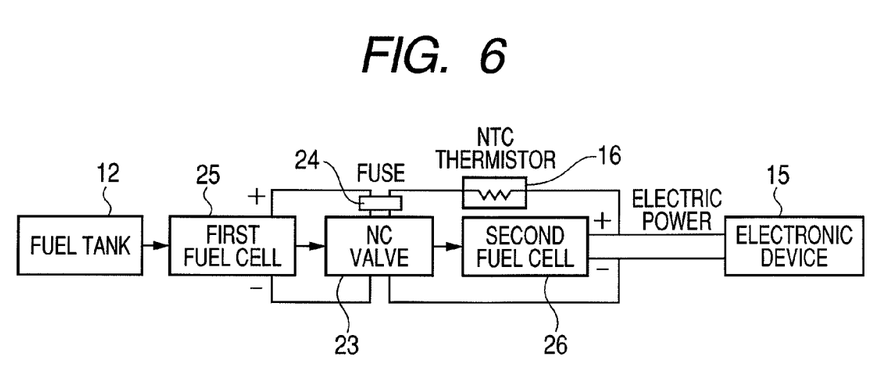
FIG. 6 is a schematic diagram illustrating a structure of a fuel cell system according to Example 4 of the present invention.

FIG. 6 illustrates a schematic diagram of a structure of the fuel cell system according to this example.

In FIG. 6, the same portions as those of the fuel cell system according to the embodiment of the present invention illustrated in FIG. 1 are denoted by the same reference numerals, so that the common portions are not described.

In FIG. 6, there are illustrated a normally closed valve (NC valve) 23, a fuse 24, a first fuel cell 25, and a second fuel cell 26.

In this example, the fuel supply control mechanism includes the normally closed valve (NC valve) 23 and the fuse 24.

The NC valve 23 is installed in the fuel flow path connecting the second fuel cell 26 to the fuel tank 12.

The NC valve 23 is continuously in a closed state when electric power is not supplied thereto, thereby interrupting the fuel supply.

On the other hand, when at least a threshold electric power is supplied to this valve, it opens, allowing the fuel to be supplied.

As the valve of this type, a solenoid valve, a bimorph piezoelectric element valve, or the like is used.

In this example, the fuel cell includes the first fuel cell 25 positioned upstream of the NC valve 23 for supplying an output to the NC valve 23 and the main second fuel cell 26 positioned downstream of the NC valve 23 for supplying an output to the electronic device 15.

The NC valve 23 is opened by the power generated by the first fuel cell 25, thereby allowing the hydrogen fuel to be supplied to the second fuel cell 26.

The NC valve 23 is connected via a circuit to the second fuel cell 26 through the NTC thermistor 16 having the negative temperature coefficient.

Further, the NTC thermistor 16 is installed so as to change its resistance according to the temperature of the second fuel cell 26.

This circuit merges with a circuit connecting the first fuel cell 25 to the NC valve 23. The fuse 24 is installed in a line obtained by the merging.

The fuse 24 is not operated in response to current of the first fuel cell 25. The fuse 24 is operated when a larger current output by the second fuel cell 26, which performs main power generation, flows.

That is, the fuse 24 can be operated when the current larger than the current of the first fuel cell 25 flows and a threshold value is exceeded.

In the case where a temperature of the second fuel cell 26, which performs the main power generation, is in the allowable range, the NTC thermistor 16 is a high resistance body and the current flowing through the circuit is small.

The output of the first fuel cell 25 is set so as to allow current at a degree required for operating the NC valve 23 to flow.

As a result, the NC valve 23 is opened and the fuel is supplied to the second fuel cell 26.

On the other hand, in the case where the temperature of the second fuel cell 26 exceeds or is equal to the threshold value, the NTC thermistor 16 suddenly reduces its own resistance by the switching characteristics illustrated in FIG. 2.

By a change in the resistance of the NTC thermistor 16, the NC valve 23 is closed through an operation of the fuse 24 and the fuel supply to the second fuel cell 26 is interrupted as described below.

That is, due to a rapid reduction in the resistance of the NTC thermistor 16, the current from the second fuel cell 26 flows in the circuit.

The fuse 24 is operated by the current of the second fuel cell 26 so as to interrupt all the current flowing through the circuit.

Therefore, the current of the first fuel cell 25 required for the operation does not flow to the NC valve 23, so that the valve is closed. Thus, the fuel is not supplied to the second fuel cell 26 and the power generation is stopped.

Accordingly, in the case where the temperature of the second fuel cell 26 exceeds the allowable range, the fuel supply is quickly interrupted and the power generation can be stopped.

Thus, an increase in the temperature of the second fuel cell 26 can be prevented, so that both the second fuel cell 26 and protection of the electronic device 15 can be protected.

Example 5

In Example 5, a fuel cell system according to a mode different from the above examples is described.

Figure 7:
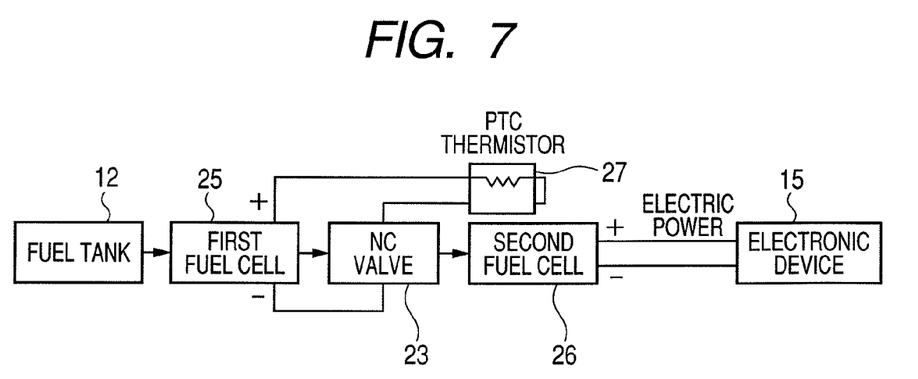
FIG. 7 is a schematic diagram illustrating a structure of a fuel cell system according to Example 5 of the present invention.

FIG. 7 illustrates a schematic diagram of a structure of the fuel cell system according to this example.

In FIG. 7, the same portions as those of the fuel cell system according to Example 4 illustrated in FIG. 6 are denoted by the same reference numerals, so that common portions are not described.

In FIG. 7, there is illustrated a PTC thermistor 27 having a positive temperature coefficient.

In this example, the PTC thermistor 27 has the positive temperature coefficient unlike in the above examples.

The fuel supply control mechanism includes the normally closed valve (NC valve) 23.

The NC valve 23 is installed in the fuel flow path connecting the second fuel cell 26 to the fuel tank 12.

The NC valve 23 is continuously in a closed state when electric power is not supplied thereto, interrupting the fuel supply.

On the other hand, the NC valve 23 is in an open state when at least threshold electric power is supplied, allowing fuel to be supplied. As the valve of this type, a solenoid valve, a bimorph piezoelectric element valve, or the like is used.

In this example, the fuel cell includes the first fuel cell 25 positioned upstream of the NC valve 23 for supplying an output to the NC valve 23 and the main second fuel cell 26 positioned downstream of the NC valve 23 for supplying an output to the electronic device 15.

By the output of the first fuel cell 25, the NC valve 23 is opened, thereby supplying the fuel to the second fuel cell 26.

The NC valve 23 is connected in a circuit to the first fuel cell 25 through the PTC thermistor 27 having the positive temperature coefficient.

Further, the PTC thermistor 27 is installed so as to be sensitive to the temperature of the second fuel cell 26.

In the case where the temperature of the second fuel cell 26 for performing the main power generation is in the allowable range, the PTC thermistor 27 is a low resistance body, and such a setting is performed that the output current from the first fuel cell 25, which is sufficient for operating the NC valve 23, flows through the circuit.

Accordingly, the fuel is supplied to the second fuel cell 26.

On the other hand, in the case where the temperature of the second fuel cell 26 exceeds the allowable range and is be equal to or is higher than a certain threshold value, the PTC thermistor 27 suddenly increases its own resistance by switching characteristics opposite to that illustrated in FIG. 2. As a result, the current of the first fuel cell 25 required for operating the NC valve 23 no longer flows through the circuit and the NC valve 23 closes.

Accordingly, the fuel is not supplied to the second fuel cell 26 and the power generation is stopped.

In this case, when the temperature of the second fuel cell 26 is reduced to be equal to or lower than the threshold value and the PTC thermistor 27 again becomes a low resistance body, the NC valve 23 is opened, thereby supplying the fuel.

If the cause of the abnormally high temperature is not resolved, the second fuel cell 26 can again reach the abnormally high temperature. Accordingly, a supply of the fuel and stoppage thereof may be repeatedly performed.

Even in this case, the power generation of the second fuel cell 26 can be periodically stopped. Accordingly, the temperature increase can be prevented or the temperature can be maintained in the allowable range.

In this state, the electronic device 15 can provide an abnormality warning to the user's attention.

Example 6

In Example 6, a fuel cell system according to a mode different from the above examples is described.

Figure 8:
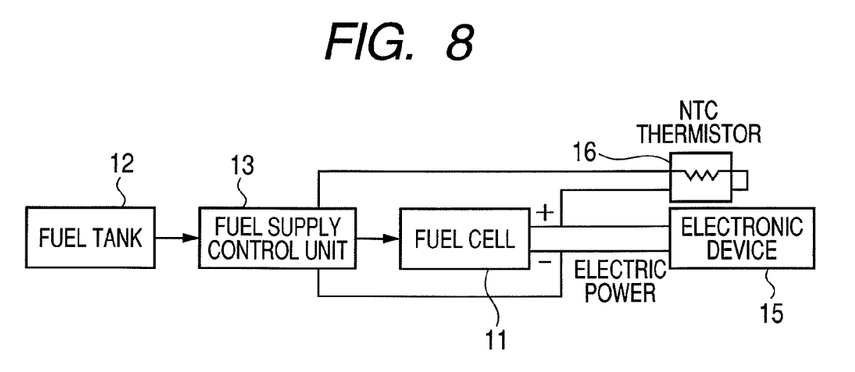
FIG. 8 is a schematic diagram illustrating a structure of a fuel cell system according to Example 6 of the present invention.

FIG. 8 illustrates a schematic diagram of a structure of the fuel cell system according to this example.

In FIG. 8, the same portions as those of the fuel cell system according to the embodiment of the present invention illustrated in FIG. 1 are denoted by the same reference numerals, so that the common portions are not described.

In FIG. 8, there is illustrated the NTC thermistor 16 having a negative temperature coefficient, which is installed on the side of the electronic device 15.

In this example, the NTC thermistor 16 having the negative temperature coefficient is disposed so as to change the resistance according to the temperature of the electronic device 15.

Further, the NTC thermistor 16 may be disposed so as to change its resistance according to both the fuel cell 11 and the electronic device 15 in a parallel circuit.

In the case where the temperature of the electronic device 15 is in the allowable range, the fuel is supplied to the fuel cell 11 to perform the power generation.

On the other hand, when the temperature of the electronic device 15 exceeds the allowable range and becomes equal to or higher than the threshold value, the thermistor member suddenly changes its own resistance, thereby changing the current flowing through the circuit.

In response to the change in the output, the fuel supply control mechanism 13 performs the interrupting operation, and the fuel cell 11 is stopped.

With the structure of this example, in the case where the temperature of the electronic device 15 exceeds the allowable range, by interrupting the fuel supply, the power generation of the fuel cell 11 is stopped. Also, a temperature increase of the side of the electronic device 15 can be prevented.

Further, the fuel cell 11 can be prevented from being damaged by the temperature increase of the electronic device 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-060133, filed Mar. 9, 2007, which is hereby incorporated by reference herein in its entirety.

What is claimed is:
1. A fuel cell system comprising:
 a fuel cell including a power generation portion provided with a fuel electrode and an oxidizer electrode, for performing power generation by a fuel supplied from a fuel tank;

a fuel supply control mechanism, which is disposed between the fuel tank and the fuel cell, and which is capable of interrupting a supply of the fuel; and a thermistor provided to a circuit connecting the fuel supply control mechanism to the fuel cell, for changing a resistance value according to at least one of a temperature of the power generation of the fuel cell and a temperature of an electronic device connected to the fuel cell to be supplied with electric power, wherein the fuel supply control mechanism is operated by a change in the resistance value of the thermistor so that the supply of the fuel is interrupted, wherein the power generation portion of the fuel cell comprises a fuel cell stack including a plurality of fuel cell units, wherein the fuel supply control mechanism is supplied with an output from at least one of the plurality of fuel cell units of the fuel cell stack, and wherein fuel cell units for supplying the output to the fuel supply control mechanism have higher heat and mechanical resistances than other fuel cell units of the fuel cell stack.

2. A fuel cell system comprising:

a fuel cell including a power generation portion provided with a fuel electrode and an oxidizer electrode, for performing power generation by a fuel supplied from a fuel tank;

a fuel supply control mechanism, which is disposed between the fuel tank and the fuel cell, and which is capable of interrupting a supply of the fuel; and a temperature sensor provided to a circuit connecting the fuel supply control mechanism to the fuel cell, for changing a resistance value according to at least one of a temperature of the power generation of the fuel cell and a temperature of an electronic device connected to the fuel cell to be supplied with electric power, wherein the fuel supply control mechanism is operated by a change in the resistance value of the temperature sensor so that the supply of the fuel is interrupted, wherein the fuel supply control mechanism comprises a normally closed valve and a fuse, wherein the fuel cell comprises a first fuel cell, which is positioned upstream of the normally closed valve, for supplying current to the normally closed valve, and a second fuel cell, which is positioned downstream of the normally closed valve, for supplying current to the electronic device, and wherein the normally closed valve is operated by an operation of the fuse owing to the change in the resistance value of the temperature sensor having a negative temperature coefficient, so that a supply of the fuel to the second fuel cell is interrupted.

3. A fuel cell system comprising:

a fuel cell including a power generation portion provided with a fuel electrode and an oxidizer electrode, for performing power generation by a fuel supplied from a fuel tank;

a fuel supply control mechanism, which is disposed between the fuel tank and the fuel cell, and which is capable of interrupting a supply of the fuel; and a temperature sensor provided to a circuit connecting the fuel supply control mechanism to the fuel cell, for changing a resistance value according to at least one of a temperature of the power generation of the fuel cell and a temperature of an electronic device connected to the fuel cell to be supplied with electric power, wherein the fuel supply control mechanism is operated by a change in the resistance value of the temperature sensor so that the supply of the fuel is interrupted, wherein the fuel supply control mechanism comprises a normally closed valve, wherein the fuel cell comprises a first fuel cell, which is positioned upstream of the normally closed valve, for supplying current to the normally closed valve, and a second fuel cell, which is positioned downstream of the normally closed valve, for supplying current to the electronic device, and wherein the normally closed valve is operated by the change in the resistance value of the temperature sensor having a positive temperature coefficient, so that a supply of the fuel to the second fuel cell is interrupted.

* * * * *